(No Model.)

H. B. CAMP.
CONDUIT SHEATHING.

No. 577,284. Patented Feb. 16, 1897.

Witnesses.
E. B. Gilchrist
Ella E. Tilden

Inventor
Horace B. Camp
By Lynch, Dorer & Donnelly
his attorneys

UNITED STATES PATENT OFFICE.

HORACE B. CAMP, OF AKRON, OHIO.

CONDUIT-SHEATHING.

SPECIFICATION forming part of Letters Patent No. 577,284, dated February 16, 1897.

Application filed February 10, 1896. Serial No. 578,634. (No model.)

*To all whom it may concern:*

Be it known that I, HORACE B. CAMP, of Akron, Summit county, Ohio, have invented certain new and useful Improvements in Conduit-Sheathing; and I do hereby declare the following to be a full, clear, and exact description of the invention, such as will enable others skilled in the art to which it apertains to make and use the same.

My invention relates to improvements in metallic sheathing for conduits more especially designed for use in holding electric wires in buildings; and it consists in certain features of construction hereinafter described, and pointed out in the claims.

Figure 1:
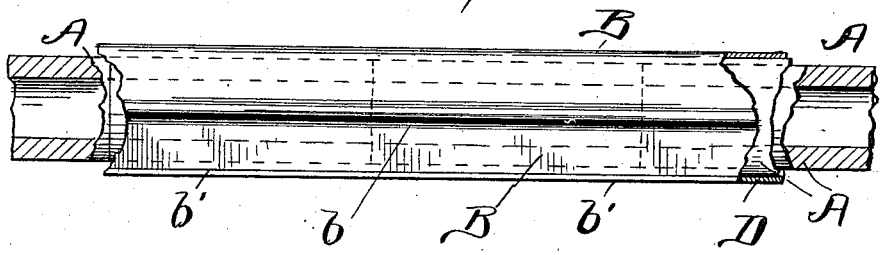
Figure 2:
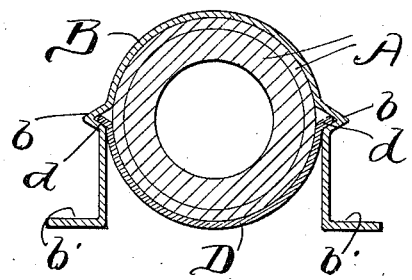

In the accompanying drawings, Figure 1 is a side elevation, partly broken away and in longitudinal section, of a conduit which has its embracing-sheathing embodying my invention; and Fig. 2 is a cross-section of the same.

Referring to said drawings, A represents the inner conduit-tube, and B and D the sheathing which covers or embraces said tube. Said sheathing is formed in sections, preferably two sections, circumferentially of the conduit. The outer section B of the sheathing embraces the outer half of the conduit-tube A and then extends inwardly at both sides of the conduit to a point flush with or slightly beyond the innermost point of the external periphery of the conduit and is then bent laterally and outwardly to form flanges $b'$ $b'$.

The inner half D of the sheathing embraces the inner half of conduit-tube A, and near its longitudinal edges is bent laterally and outwardly, as at $d$, into recesses or pockets $b$, formed in sheathing B by suitably corrugating said sheathing B. Portions of sheathing B that terminate in flanges $b'$ have, preferably, sufficient springiness to enable them to retain recesses or pockets $b$ in their operative position.

Flanges $b'$ $b'$ constitute members that are instrumental in fixing the conduit in position by nails or screws passed therethrough into the supporting object. Sheathing B and D extend, preferably, the entire length of the conduit, so as to effectually protect the latter against external injury.

What I claim is—

1. A conduit suitably metallically sheathed externally, and having the sheathing composed of an inner section D and an outer section B embracing the longitudinal edges of the inner sheathing-section and extending inwardly at opposite sides of the conduit flush with or beyond the innermost extremity of the conduit, and said extensions of said outer sheathing-section terminating in laterally and outwardly projecting flanges $b'$, substantially as shown, for the purpose specified.

2. A conduit of the character indicated, that is suitably metallically sheathed, and has the sheathing composed of two sections, the inner section D bent laterally and outwardly near its longitudinal edges, and the other section B suitably shaped to embrace the longitudinal edges of the inner sheathing-section and extending beyond said edges of the inner section a suitable distance and terminating in laterally and outwardly projecting flanges $b'$, substantially as shown, for the purpose specified.

In testimony whereof I sign this specification, in the presence of two witnesses, this 1st day of February, 1896.

HORACE B. CAMP.

Witnesses:
LOUIS W. CAMP,
AMELIA M. CAMP.